2,715,451

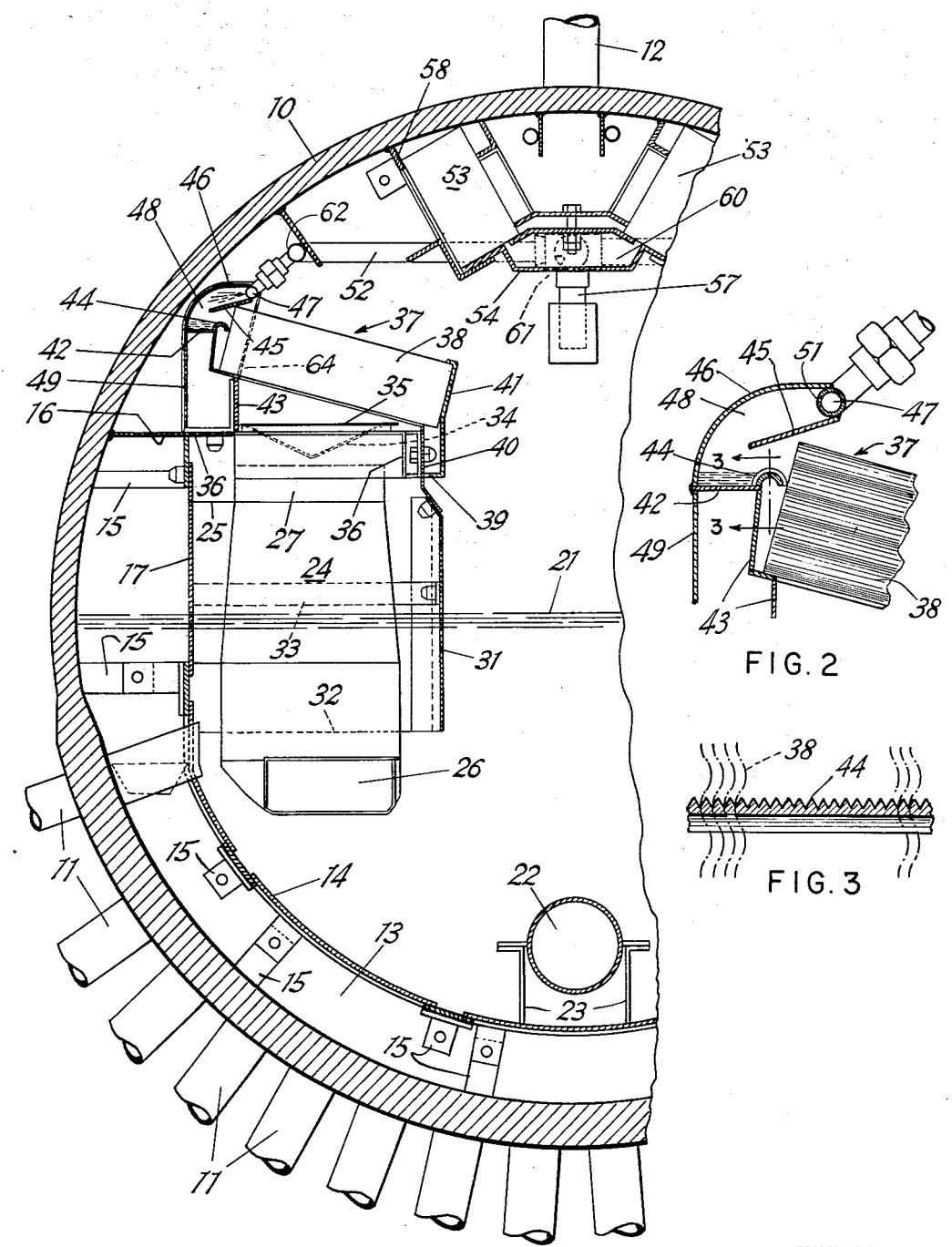

FLUID PURIFYING APPARATUS

Forrest G. Raynor, Baldwin, N. Y., assignor to The Babcock & Wilcox Company, Jersey City, N. J., a corporation of New Jersey Application January 8, 1952, Serial No. 265,472

10 Claims. (Cl. 183—28)

The present invention relates to improved apparatus for washing and drying gaseous fluids and more particularly to washing means for improving the purity of steam delivered by a steam generator.

High pressure steam generated in a boiler for power purposes, usually contains small amounts of impurities such as silica and other boiler water salts, which during the transformation of energy in the associated turbine, are frequently deposited on the surfaces of blades and other internal turbine parts. An accumulation of these deposits results in reduced turbine efficiency and loss of turbine availability while deposits are being removed.

The transportation of contaminating matter by the steam to the turbine is generally considered to be either by mechanical entrainment with the steam, by vaporization or solution in the steam, or by a combination of these processes. Mechanical entrainment can be reduced by efficient separation of liquid and vapor through the use of centrifugal forces, for example, providing the physical properties of the liquid-vapor mixture are conducive to mechanical separation. Contaminants present in the steam as the result of incomplete mechanical separation, or in a vapor form or in solution with the steam can be removed by intimate contact between a relatively pure wash liquid and steam. Attempts have been made to remove contaminating matter from the steam by washing and/or condensation, where intimate contact between the wash liquid and the carrier steam has been attained by means of liquid sprays projected into the steam. In high pressure steam generation spray washing of steam has not been adequate due to the difficulty of projecting fine water particles into a high density steam stream.

In accordance with my invention, I provide an improved washing apparatus wherein a high purity liquid in film form is brought into intimate contact with the contaminated gaseous fluid. The contaminants are trapped by contact with the liquid film and removed with the liquid in a dilute condition. When the invention is applied in the generation of steam, I provide a primary steam and water separator to remove the major portion of the water from the mixture. Thereafter, the substantially moisture free steam is passed through a washer arranged to cause the steam to contact moving films of relatively pure water, so that the contaminants are trapped by and removed with the wash water. Thereafter, the steam, with any entrained moisture therein is passed through a second steam and water separator to remove substantially all of the liquid remaining therein. I have found that the moisture entrained with the steam leaving the washer of the invention contains a lesser proportion of contaminants than the droplets entering the washer, and any build-up of solid deposits in the second steam and water separator is thereby substantially eliminated.

The various features of novelty which characterize my invention are pointed out with particularity in the claims annexed to and forming a part of this specification. For a better understanding of the invention, its operating advantages and specific objects attained by its use, reference should be had to the acompanying drawings and descriptive matter in which I have illustrated and described an embodiment of the invention.

Of the drawings:

Fig. 1 is a transverse view, in section, of the interior of a steam and water drum incorporating a washer constructed in accordance with the invention;

Fig. 2 is an enlarged section view of a portion of the structure shown in Fig. 1; and Fig. 3 is a view taken on line 3—3 of Fig. 2.

While the washing means of the present invention is illustrated and described in connection with the steam and water drum of a steam generator, it will be understood that the invention is applicable to the washing of other gaseous fluids containing contaminating matter in solution or suspension therein. Furthermore, it will be understood the washing means of the present invention can be externally positioned with respect to the steam and water drum of a steam generator, or the separating and washing means may be installed in separate housings and connected for the flow of the gaseous fluid sequentially therethrough.

As shown in Fig. 1 the steam and water drum 10 is provided with a plurality of riser tubes 11 opening into the lower portion thereof. As shown, the drum 10 is provided with steam outlet tubes 12 positioned in the upper portion of the drum and is also provided with the customary feed water pipe 22. The steam and water drum is also provided with the necessary downcomer tubes connected into the circulatory system of the steam generator. In the drum illustrated, the downcomer tubes are positioned at opposite ends of the drum.

The mixture of steam and water flowing through the tubes 11 enters a collecting chamber 13 formed by a series of curved plates 14 inwardly spaced from the lower segment of the drum wall. The plates 14 are suitably supported by brackets 15 attached to the exterior wall of the drum. In the embodiment shown, the collecting chamber 13 is provided with end closure plates (not shown) and top closure plates 16. The upper portion of the collecting chamber 13 is provided with a series of removable plates 17, the major portion of which extends above the horizontal centerline of the drum 10.

The removable plates 17 are provided with a spaced series of ducts 25 projecting inwardly of the drum and tangentially opening into a row of steam and water separators of the cyclonic type. The general construction of the cyclonic type of separator and the collecting chamber, is disclosed in detail in the Fletcher U. S. Patent 2,368,211. As described in the patent and shown in Fig. 1, each separator 24 is provided with a bottom outlet 26 at the lower end thereof and an upper outlet 27 at the top of the cyclone. Steam and water are separated within the separator 24 by centrifugal forces with the steam passing upwardly through the outlet 27, while the separated water discharges downwardly through the outlet 26. Ordinarily the water level 21 within the drum is maintained at approximately the position of the drum horizontal centerline. The water level may however vary a foot or more in the normal course of operations, but should not vary beyond the limits of the height of the cyclone 24.

The steam leaving the outlet 27 of each of the separators 24 passes upwardly through a perforated plate formed as an inverted pyramid 34. Each pyramid 34 depends from a base plate 35 having an opening therein corresponding with the base of the pyramid and is supported by suitable braces 36, which form part of the support structure of a seal skirt 31. The skirt 31 extends from end to end of the separator row within the boiler drum, and projects downwardly to a level adjacent the lower end portion of the separators 24. The skirt 31 is provided with end plates 32 and suitable braces 33, and encloses the row of separators 24. As a result, all of the steam discharged through the outlets 27 of the separators 24 must pass upwardly through the perforated plates of the pyramids 34.

The washing means or scrubber 37 of the present invention is positioned above the pyramid 34 and is supported by suitable extensions from the braces and structural supports of the separators 24 and pyramid 34. The scrubber 37 is formed from a series of rectangular imperforate corrugated plates 38 which are assembled in groups so that the plates are upright and in closely spaced parallel relationship to define sinuous or undulating steam flow channels therebetween. Each plate corrugation is parallel to the long dimension of the rectangular plate 38. The scrubbers 37 may be rectangular or square in plan section, and are arranged side by side in a longitudinal row above the separators 24 and the pyramids 34. As shown, the scrubbers are arranged with the edges of plates 38 lying in planes which are radial with respect to the longitudinal axis of the drum 10. The scrubbers are inclined downwardly at an angle of approximately 15° with respect to the horizontal from a position adjacent the wall toward the interior of the drum 10.

The scrubbers are supported at their lower edge by a clamp plate 41 which extends longitudinally of the drum to enclose the series of scrubbers, and projects downwardly below the upper end portion 40 of the seal skirt 31. The lower end portion of the clamp plate 41 is spaced from the portion 40 by a flange 39 which is provided with a spaced series of ports therein for the discharge of wash water from the lower end of the scrubbers to the interior of the drum 10. The upper edge of the scrubbers 37, adjacent the wall of the drum 10, is supported by an upstanding closure plate 43 having an inclined shoulder portion and an upright upper end portion attached to a horizontally disposed shelf 42. The shelf 42 is positioned intermediate the height of the scrubbers 37 and defines the bottom of a wash water reservoir 48.

Wash water, which is obtained from an external source, enters one end of the drum through a pipe 61 which extends longitudinally of the upper portion of the drum 10. From entrance pipe 61 branch connecting pipes 52 extend horizontally toward the wall of the drum and connect to manifold header 62. From manifold header 62 a series of longitudinally spaced branch pipes 63 connect to header pipe 47 which is of a length equal to the length of the individual scrubber elements 37. Each manifold 47 is provided with a spaced series of apertures 51 in the wall thereof which project jets of water in a generally horizontal direction against a curved plate 46 which extends from a juncture with the plate 49 to a position adjoining the upper side of the manifold 47. A baffle plate 45 is attached to the lower side of the manifold 47 and extends downwardly and toward the drum wall to direct the water discharged from the jets 51 toward the shelf 42. The structure described provides a distributed flow of wash water to a series of reservoirs 48 positioned adjacent the outer edge of the scrubbers 37. Plates 64 separate the reservoirs 48 and the corresponding scrubbers 37.

The wash water discharges from the reservoir 48 over a distributor 44 to the plates of the scrubber 37. The distributor is formed from a threaded pipe, which is longitudinally cut along the axis thereof, with one edge welded to the shelf 42 and the other edge positioned adjacent the edge of plates 38 intermediate the height of the scrubber. As shown particularly in Fig. 3 the distributor is located in a level position so that the inner apex of each thread on the pipe is in alignment with a plate 38. Thus the threaded pipe of the distributor forms a plurality of weirs corresponding with the plates of the scrubber. In the embodiment shown the pipe is cut with eight V section threads per inch, and the plates 38 are spaced with ⅛ inch between plate centerlines. Other plate spacing can be used, but I prefer to maintain the spacing between plate centerlines and the weirs substantially equal for best distribution of water to the scrubber.

With the distributor 44 positioned intermediate the height of the scrubber plates 38, the wash water will flow in film form along the surfaces of the plates to the discharge end of the scrubber. The upper surfaces of the corrugated plates, i. e. above the level of weir discharge to the plates 38, serves as a separator for any large drops of moisture entrained by the steam passing through the lower wetted wall portion of the scrubber. The drops collected on the scrubber surfaces also flow downwardly along the plates to the discharge end of the scrubber.

The wash water may originate as steam condensate obtained from a closed feed water heater included in the steam generator and turbine installation. Under such circumstances the wash water will be of high purity. Alternately, the wash water may originate in the boiler feed water. Under these circumstances the wash water will not be pure, but will have a purity considerably greater than that of the water in the steam and water drum of the boiler. With the wash water having a higher degree of purity than the moisture in the steam passing in intimate surface contact therewith, the steam will be effectively washed and its quality improved by the absorption of the contaminants in the wash water.

The steam leaving the scrubbers 37 passes upwardly through a row of secondary steam and water separators 53 and thence through the row of steam outlet tubes 12. The separators 53 are formed of closely spaced parallel corrugated plates which are positioned with their edges lying in planes which are radial with respect to the longitudinal axis of the drum 10. The steam is directed into the inlet side 55 of the separators 53 by baffle plates 54 and 58 which are supported from the drum wall by suitable brackets. The baffle 54 connects the lower edges of the separators 53 on both sides of the outlet tubes 12 and defines the lower portion of a moisture collecting chamber 60 which receives the water separated from the steam and water mixture passing through the sinuous passageways formed by the corrugated plates in the separators 53. The moisture is discharged into the interior of the drum 10 through the drains 57.

In the operation of the apparatus described, the steam and water mixture discharged from the steam generating tubes 11 passes through the chamber 13 into the rows of cyclonic separators 24. The water separated in the separators 24 is discharged through the outlets 26 while the steam is discharged upwardly through the pyramids 34 into the scrubbers 37. A major portion of the water is removed from the steam by the separators 24 and pyramids 34, but any moisture retained with the steam is heavily laden with contaminating matter. The wash water films passing over the plates 38 of the scrubber 37 are intimately contacted by the steam passing in a sinuous path between the plates with the wash water films thereon capturing the contaminating matter by adhesion and by the difference in vapor pressure between the contaminants in vapor form or in solution with the steam. The wash water, with captured contaminants, discharges from the scrubbers 37 through the ports 39 out of the steam flow path and into the interior portion of the drum. Moisture entrained by the steam leaving the scrubbers 37 will be comparatively pure and is separated in the secondary separators 53, with the steam discharged through the tubes 12 being substantially dry and of high quality.

While in accordance with the provisions of the statutes I have illustrated and described herein a preferred embodiment of the invention, those skilled in the art will understand that changes may be made in the method of operation and form of the apparatus disclosed without departing from the spirit of the invention covered by my claims, and that certain features of the invention may sometimes be used to advantage without a corresponding use of other features.

I claim:

1. Apparatus for purifying a wet gas comprising a casing having a gas outlet in its upper portion, primary gas and liquid separating means in the path of wet gas passing toward said outlet, means for washing the gas leaving said primary gas and liquid separating means including a plurality of closely spaced parallel upright plates projecting across the flow path of said gas, means for forming a moving film of wash liquid directly on said plates including a liquid reservoir positioned adjoining an upright edge of said plate, and secondary gas and liquid separating means interposed in the flow path of said gas between said washing means and said gas outlet.

2. Apparatus for purifying a wet gas comprising a casing having a gas outlet in its upper portion, primary gas and liquid separating means in the path of wet gas passing toward said outlet, means for washing the gas leaving said primary gas and liquid separating means including a plurality of closely spaced parallel plates projecting across the flow path of said gas, means for forming a moving film of wash liquid directly on said plates including an external source of relatively pure wash liquid and a reservoir having a weir positioned intermediate an adjacent upright edge of said plates, and secondary gas and liquid separating means interposed in the flow path of said gas between said washing means and said gas outlet.

3. Apparatus for purifying steam comprising a casing having a steam outlet in its upper portion, primary steam and water separating means in the path of wet gas passing toward said outlet including a row of centrifugal separators each having an inverted perforated plate pyramid positioned above and in the path of steam flow from said separators, means for washing the steam leaving said primary gas and liquid separating means including a plurality of upright closely spaced parallel plates inclined downwardly across the flow path of said steam, means for directly forming a moving film of wash water having a relatively high purity on said plates, and secondary steam and water separating means interposed in the flow path of said gas between said washing means and said gas outlet.

4. Apparatus for purifying steam comprising a steam and water drum having a steam outlet in the upper portion thereof and tubes opening to said drum for the admission thereto of a mixture of steam and water, a steam and water separator within said drum and arranged for the upward discharge of substantially dry steam therefrom, and steam washing means associated with said steam and water separator for the passage of separated steam upwardly therethrough, said steam washing means including closely spaced parallel corrugated plate members arranged above and across said separator steam discharge and having horizontally extending corrugations inclined for the gravitational flow of wash water therealong, and means for causing a washing liquid to flow along the length of said corrugations towards the lower end thereof.

5. Apparatus for purifying wet steam comprising a steam and water drum having a steam outlet in the upper portion thereof and tubes opening to the lower portion of said drum for the admission thereto of a mixture of steam and water, primary steam and water separators within said drum for the parallel flow of steam therefrom, steam washing means associated with said primary steam and water separators for the passage of separated steam therethrough, said steam washing means including closely spaced wall members defining a plurality of parallel steam flow passages, a reservoir of wash water adjoining an upper edge of said wall members, a distributing weir positioned to distribute the flow of wash water from said reservoir to the surfaces of said wall members, and secondary steam and water separators positioned between said washing means and said steam outlet to remove substantially all of the moisture in the steam leaving said washing means.

6. Apparatus for purifying wet steam comprising a steam and water drum having a steam outlet in the upper portion thereof and tubes opening to said drum for the admission thereto of a mixture of steam and water, a row of primary steam and water separators within said drum for the parallel flow of steam therefrom, steam washing means associated with said primary steam and water separators for the passage of separated steam therethrough, said steam washing means including inclined closely spaced wall members defining a plurality of parallel steam flow passages, a reservoir of wash water adjoining an upper edge of said wall members, a horizontally disposed distributing weir between said reservoir and said wall members to distribute the flow of wash water to the surfaces of said wall members, and a wash water discharge chamber adjacent the lower corner of said wall members and out of the steam flow path to receive said wash water.

7. Apparatus for purifying wet steam comprising a steam and water drum having a steam outlet above the water line and a steam and water mixture inlet below the water line thereof, a row of cyclonic steam and water separators positioned along a wall of said drum, means for passing all of the steam and water mixture entering said drum through said steam and water separators, steam washing means within said drum positioned to receive all of the steam from said separators, said washing means including a plurality of closely spaced corrugated plates, a wash water distributor positioned adjoining an edge of said plates to direct the flow of a film of water downwardly along the surfaces thereof and in surface contact with the steam flowing between said plates, and secondary steam and water separator means positioned between said washing means and said drum steam outlet.

8. Apparatus for purifying wet steam comprising a steam and water drum having a steam outlet above the water line thereof and a steam and water mixture inlet thereto, a row of cyclonic steam and water separators positioned along a wall of said drum, means for passing all of the steam and water mixture entering said drum through said steam and water separators, and steam washing means within said drum positioned to receive all of the steam from said separators, said washing means including a plurality of upright closely spaced corrugated plates having their edges lying in radial planes relative to the axis of said drum, a wash water distributor positioned adjoining an edge of said plates to direct the flow of film of water downwardly along the surfaces thereof and in surface contact with the steam flowing between said plates.

9. Apparatus for purifying wet steam comprising a steam and water drum having a steam outlet above the water line and a steam and water mixture inlet below the water line thereof, a row of cyclonic steam and water separators positioned along a wall of said drum with their steam outlets above the drum water level, means for passing all of the steam and water mixture entering said drum through said steam and water separators, steam washing means within said drum positioned to receive all of the steam from said separators, said washing means including a plurality of closely spaced corrugated plates, a wash water distributor positioned adjoining an edge of said plates to direct the flow of a film of water downwardly along the surfaces thereof and in surface contact with the steam flowing between said plates, a wash water receiving chamber positioned along the lower edge of said washer and out of direct contact with the steam passing through said washing means, and secondary steam and water separator means positioned between said washing means and said drum steam outlet.

10. Apparatus for purifying wet steam comprising a steam and water drum having a steam outlet above the water line and a steam and water mixture inlet below the water line thereof, a row of cyclonic steam and water separators positioned along a wall of said drum with their steam outlets above the drum water level, a perforated plate inverted pyramid positioned above each of said cyclonic separators, means for passing all of the steam and water mixture entering said drum through said steam and water separators and said inverted pyramids, steam washing means within said drum positioned to receive all of the steam from said separators, said washing means including a plurality of closed spaced corrugated plates defining sinuous steam flow paths therebetween, a wash water distributor positioned adjoining an edge of said plates to direct the flow of a film of water downwardly along the surfaces thereof and in surface contact with the steam flowing between said plates, a wash water receiving chamber positioned along the lower edge of said washer and out of direct contact with the steam passing through said washing means, and secondary steam and water separator means positioned between said washing means and said drum steam outlet.

References Cited in the file of this patent

UNITED STATES PATENTS

| | | |
|---|---|---|
| 1,103,995 | Murray | July 21, 1914 |
| 1,948,524 | Kerr | Feb. 27, 1934 |
| 2,434,663 | Letvin | June 20, 1948 |